United States Patent
Jing et al.

(10) Patent No.: US 10,171,021 B2
(45) Date of Patent: Jan. 1, 2019

(54) METHODS FOR DETERMINING A VOLTAGE COMMAND

(71) Applicant: GM GLOBAL TECHNOLOGY OPERATIONS LLC, Detroit, MI (US)

(72) Inventors: Xin Jing, Rochester, MI (US); Brian A. Welchko, Oakland, MI (US); Constantin C. Stancu, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/479,170

(22) Filed: Apr. 4, 2017

(65) Prior Publication Data
US 2018/0287540 A1    Oct. 4, 2018

(51) Int. Cl.
| | |
|---|---|
| H02M 5/04 | (2006.01) |
| H02M 7/04 | (2006.01) |
| H02M 7/44 | (2006.01) |
| H02P 23/00 | (2016.01) |
| H02M 3/04 | (2006.01) |
| B60L 15/20 | (2006.01) |

(52) U.S. Cl.
CPC ...... *H02P 23/0077* (2013.01); *B60L 15/2045* (2013.01); *H02M 3/04* (2013.01); *H02M 5/04* (2013.01); *H02M 7/04* (2013.01); *H02M 7/44* (2013.01); *H02P 23/009* (2013.01)

(58) Field of Classification Search
CPC ............... H02P 23/0017; H02P 23/009; B60L 15/2004; H02M 3/04

USPC ........................................................ 318/504
See application file for complete search history.

(56) References Cited

U.S. PATENT DOCUMENTS

| | | | |
|---|---|---|---|
| 2017/0085200 A1* | 3/2017 | Campbell | H02P 21/22 |
| 2017/0317635 A1* | 11/2017 | Campbell | H02P 21/22 |

FOREIGN PATENT DOCUMENTS

DE    10 2012 210 010 A1    12/2013

OTHER PUBLICATIONS

Yu,C., et al., "Optimum DC Bus Voltage Analysis and Calculation Method for Inverters/Motors With Variable DC Bus Voltage," IEEE Transactions on Industry Applications, vol. 49, No. 6, Nov./Dec. 2013, p. 2619-2627.

(Continued)

*Primary Examiner* — Eduardo Colon Santana
*Assistant Examiner* — Devon Joseph
(74) *Attorney, Agent, or Firm* — Lorenz & Kopf, LLP

(57) ABSTRACT

Methods may involve determining a minimum voltage for a voltage command. A maximum voltage for the voltage command may be determined. A first representation of a first performance curve corresponding to the minimum voltage may be determined. A second representation of a second performance curve corresponding to the maximum voltage may be determined. An operating point to be achieved through the voltage command may be obtained. An evaluation may be made of whether the operating point lies between the first and second representations. When the operating point lies between the first and second representations, an interpolation may be conducted between the first and second representations to determine a magnitude of the voltage command.

20 Claims, 5 Drawing Sheets

(56) References Cited

OTHER PUBLICATIONS

DPMA, Office Action issued in German Patent Application No. 10 2018 107 714.9, dated Oct. 5, 2018.
Dirk Schroder: Elektrische Antriebe—Regelung von Antriebssystemen. 4. Auflage. Berlin Heidelberg: Springer-Verlag, 2015. S. 1100-1119.-ISBN 978-3-642-30096-7.

* cited by examiner

METHODS FOR DETERMINING A VOLTAGE COMMAND

INTRODUCTION

The present invention generally relates to methods for determining a voltage command, and more particularly relates to determining an optimal voltage command for efficient control at system operating points.

Electrically controlled systems may include those with a controlled component that may be supplied with electric power. The controlled component may be operated under consistent conditions, or may be operated under varying conditions. When operated under varying conditions, or whenever operation bandwidth may be desired, mechanisms to change the response of the controlled component to match those conditions or preferences may be desirable. Changing the response may involve system control to change the supplied voltage, current, and/or other characteristics of the supplied power. Desirable features and characteristics of determining a voltage command, or control of a system, will become apparent from the subsequent description and the appended claims, taken in conjunction with the accompanying drawings.

SUMMARY

A number of methods may involve determining a minimum voltage for a voltage command. A maximum voltage for the voltage command may also be determined. A representation of a performance curve corresponding to the minimum voltage may be determined. A second representation of a second performance curve corresponding to the maximum voltage may be determined. An operating point to be achieved through the voltage command may be obtained. An evaluation may be made to determine whether the operating point lies between the first and second representations. When the operating point lies between the first and second representations, an interpolation may be conducted between the first and second representations to determine a magnitude of the voltage command.

A number of additional methods may involve providing a system that operates in response to a voltage command at a minimum voltage, a maximum voltage, and between the minimum and maximum voltages. A representation may be determined for a maximum torque per ampere (MTPA), curve at the minimum voltage. A second representation may be determined for an MTPA curve at the maximum voltage. An operating point to be achieved through the voltage command may be obtained. An evaluation may be made to determine whether the operating point lies between the first and second representations, meaning whether the operating point has factors that are greater than the first representation and less than the second representation. When the operating point does lie between the first and second representations, an interpolation may be conducted between the first and second representations to determine the magnitude of the voltage command.

A number of other methods may involve providing a system that operates in response to a voltage command. The system may operate at a minimum voltage, a maximum voltage, and between the minimum and maximum voltages. A first representation of a first MTPA curve may be determined at the minimum voltage, wherein the first MTPA curve may represent maximum torques achieved by a motor for the minimum voltage at various speeds. A second representation of a second MTPA curve may be determined at the maximum voltage, wherein the second MTPA curve represents maximum torques achieved by the motor for the maximum voltage at various speeds. Additional representations may be determined between the first representation and the second representation, wherein each of the additional representations may correspond to a discrete MTPA performance curve, each of which corresponds to an incremental voltage between the minimum voltage and the maximum voltage. An operating point may be obtained, which may be achieved by the motor through the voltage command. Whether the operating point lies between the first and second representations may be determined, meaning determining whether the operating point has factors that are greater than the first representation and less than the second representation. When the operating point does lie between the first and second representations, interpolation may be carried out between the first and second representations to determine the magnitude of the voltage command. Which of the incremental voltages is an optimum voltage to operate the motor at the operating point may be determined, and the optimum voltage may be selected. The motor may be operated at the optimum voltage to propel a vehicle.

Other methods within the scope of the present disclosure will become apparent from the description provided herein.

BRIEF DESCRIPTION OF THE DRAWINGS

The present invention will hereinafter be described in conjunction with the following drawing figures, wherein like numerals denote like elements.

DETAILED DESCRIPTION

Figure 1:
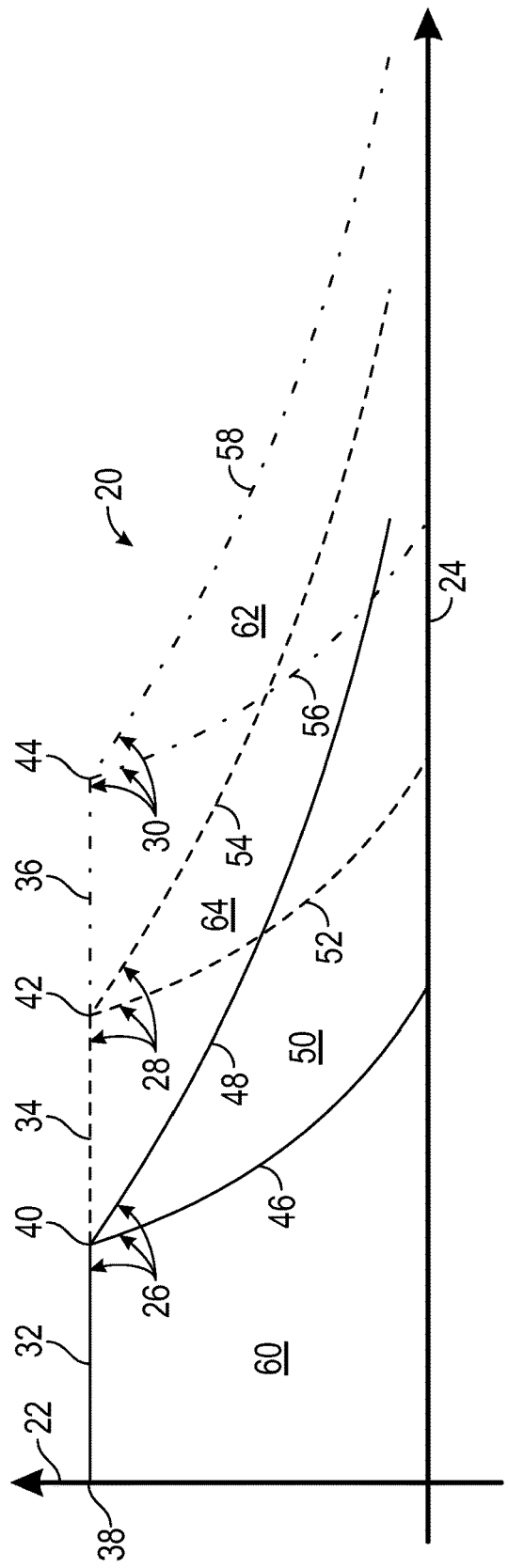
FIG. 1 is a demonstrative chart of torque versus speed at various voltages with torque on the vertical axis and speed on the horizontal axis.

The following detailed description is merely exemplary in nature and is not intended to impose limits on the variation of any examples or on their application. Furthermore, there is no intention to be bound by any theory presented in the preceding introduction or the following detailed description.

In the supply of electrical power for a given system, a number of factors may be considered when determining the characteristics of the power supplied. These may include the nature of the source, the type of current, the components involved, and others. By way of example, reference is directed to FIG. 1, which depicts a chart 20 of torque on the vertical axis 22 versus speed on the horizontal axis 24, with a number of demonstrative performance curves. In a number of examples, when torque and speed factors may be involved, the chart 20 may relate to an electrical machine with a rotor, where torque may be the torque developed by the rotor, and speed may be the angular speed of the rotor. In this case, the graph shows performance curves for three different demonstrative voltages at which a system may be described: voltage A at performance curves 26, voltage B at performance curves 28, and voltage C at performance curves 30. While performance curves for three voltages are depicted for purposes of the present description, it should be understood that any number of voltages could be involved. It should be understood that a system may generally operate with a minimum voltage, which in this example is voltage A shown by performance curves 26, and with a maximum voltage, which in this example is voltage C shown by performance curves 30. In a number of examples, the minimum voltage may depend on the source voltage. For example, when the source voltage may involve a battery/fuel cell, the terminal voltage of the battery/fuel cell may determine the minimum voltage. In other examples, where the source voltage may be from an electric distribution system, an alternating current (AC) to direct current (DC) converter, or other source, the voltage supplied through that source may determine the minimum voltage. In other examples, another voltage status of the source may determine the minimum voltage. In a number of examples, the maximum voltage may be determined by the system's component performance ratings, capabilities, or by other limitations. In a number of examples, each of performance curves 26, 28 and 30 may have a constant torque segment 32, 34, 36 extending from the axis 22 to the right (as viewed), with increasing speed. It should be understood that the constant torque segments 34 and 36 each extend horizontally to the axis 22 at point 38. The constant torque section for performance curves 26 extends from point 38 to point 40 in this example. The constant torque section for performance curves 28 extends from point 38 to point 42 in this example. The constant torque section for performance curves 30 extends from point 38 to point 44 in this example.

With reference to performance curves 26 of the voltage A, when speed may be increased to the right beyond point 40, the performance curve may include MTPA curve 46, which may represent the maximum speed that can be achieved for the voltage A at various torques. As speed may be increased beyond point 40, torque output is reduced along MTPA curve 46, as the MTPA curve 46 slopes downward. MTPA curve 46 may be referred to as a base speed locus curve for voltage A, and the speed at point 40 may be referred to as the base speed. MTPA curve 46 may be viewed as demonstrating torque and speed limits at the voltage A, without other contributing control strategies being employed to overcome those limits. In a number of examples, field weakening control may be employed as one method of overcoming those limits. In this example, the speed and torque may be increased for voltage A beyond the MPTA curve 46 to a maximum torque curve 48, such as by employing field weakening control. Speeds could be increased within the field weakening region 50 (between MTPA curve 46 and Maximum torque curve 48), by employing field weakening controls. For example, field weakening may entail introducing a current component in the d-q frame of a motor to reduce the flux density in its air-gap, allowing speed to increase above the MTPA curve 46. For example, manipulating the d-axis current into a motor may weaken the rotor field, which may decrease back electromotive force voltage, allowing higher stator current to flow into the motor at the same voltage A, resulting in higher speed. In the examples of FIG. 1, the trajectories 28 and 30 demonstrate that increasing the voltage (such as to voltage B or to voltage C), also enables higher achievable speeds. This is shown by the additional exemplary performance curves where performance curves 28 for voltage B may have MTPA curve 52, and a maximum torque curve 54. Similarly, performance curves 30 for voltage C may have MTPA curve 56, and a maximum torque curve 58. Accordingly, speed may be increased above an MPTA curve in multiple ways, which may include introducing field weakening controls, or supplying a higher voltage, or through other methods.

In a number of examples, in a system such as one employing power electronics, conduction and switching losses may be considered. The power electronics may employ power semiconductor devices such as an insulated-gate bipolar transistor (IGBT), a metal-oxide semiconductor field-effect transistor (MOFSET), diodes, or other devices. For example, in a control system with IGBT components, the following equation may be considered:

$$P_{con(Q)} = \frac{V_T}{2\pi} \cdot \left(1 + \frac{\pi}{4} \cdot MI \cdot \cos \phi\right) \cdot I_s + \frac{R_T}{8} \cdot \left(1 + \frac{8}{3\pi} \cdot MI \cos \phi\right) \cdot I_s^2$$

where: $P_{con(Q)}$ is power loss of the IGBT due to conduction; $V_T$ is equivalent voltage drop of the IGBT; MI is the modulation index—how much the modulated variable of the carrier signal varies around its unmodulated level; $I_s$ is the phase current through the IGBT; $R_T$ is equivalent resistance of the IGBT; and $\phi$ is the phase angle between voltage and current. In addition, for a control system with diode components, the following equation may be considered:

$$P_{con(D)} = \frac{V_D}{2\pi} \cdot \left(1 - \frac{\pi}{4} \cdot MI \cdot \cos \phi\right) \cdot I_s + \frac{R_D}{8} \cdot \left(1 - \frac{8}{3\pi} \cdot MI \cos \phi\right) \cdot I_s^2$$

where: $P_{con(D)}$ is power loss of the diode due to conduction; $V_D$ is equivalent voltage drop of the diode; MI is the modulation index; $I_s$ is the phase current through the diode; $R_D$ is equivalent resistance drop of the diode; and $\phi$ is the phase angle between voltage and current. Conduction losses may occur as a result of conduction and may be greatest when the device is in full conduction mode. As can be seen the losses are a function of modulation index. In a system with both IGBT and diode components, the conduction loss equations may be summed, and it can be seen that the opposite signs, present in the second parentheticals of the respective equations, will result in some canceling out of conduction losses between the IGBT component and the diode component. When summed, the difference between the two equations will result in the conduction loss. Accordingly, in a system with both IGBT and diode components, the delta conduction losses due to the modulation index or the bus voltage change may be minor.

With regard to switching losses, which may occur when a device is transitioning between blocking and conducting states, as an example the following equation may be considered for IGBT components:

$$P_{sw(Q)}|_{SVPWM} = E_{sw(Q)} \cdot f_{sw} \cdot \frac{I_s}{I_{spec}} \cdot \left(\frac{V_{dc}}{V_{spec}}\right)^{1.2}$$

Where: $P_{sw(Q)}$ is the power loss of the IGBT due to switching; SVPWM signifies space vector pulse width modulation; $E_{sw(Q)}$ is IGBT switching energy loss; $f_{sw}$ is switching frequency; $I_s$ is phase current through the IGBT; $I_{spec}$ is the IGBT's rated current; $V_{dc}$ is dc voltage; and $V_{spec}$ is the IGBT's rated voltage. Similarly, the following equation may be considered for switching losses due to diode components:

$$P_{sw(D)}|_{SVPWM} = E_{sw(D)} \cdot f_{sw} \cdot \frac{I_s}{I_{spec}} \cdot \left(\frac{V_{dc}}{V_{spec}}\right)^{1.0}$$

Where: $P_{sw(D)}$ is the power loss of the diode due to switching; SVPWM signifies space vector pulse width modulation; $E_{sw(D)}$ is diode switching energy loss; $f_{sw}$ is switching frequency; $I_s$ is phase current through the diode; $I_{spec}$ is the diode's rated current; $V_{dc}$ is dc voltage; and $V_{spec}$ is the diode's rated voltage. From these switching loss equations, it is demonstrated that when the voltage is increased, the power loss will also increase. In the case of switching losses, summation has no opposite signs for canceling-out, and so the effect is that an increase in voltage results in losses that may be considered for improvement. In a number of examples, another factor to consider may be that increasing voltage may result in increased motor core loss. In the examples for which the preceding equations demonstrate, other things being equal, it is discovered that simply increasing voltage may not be the optimal path to provide efficiency improvements, for example to reduce power electronics losses.

With reference again to FIG. 1, the MTPA curve 46 defines an MTPA region 60 for the voltage A, that is located under the performance curves 26, and generally to the left (as viewed), from the MPTA curve 46. In this MTPA region 60, any torque and speed points can be achieved at any of voltages A, B, or C without implementing field weakening control. This is because voltage A may allow operating under MPTA control at torques and speeds up to MPTA curve 46, voltage B may allow operating under MTPA control at torques and speeds up to MTPA curve 52, and voltage C may allow operating at torques and speeds up to MTPA curve 56 under MPTA control. In other words, MPTA control may be provided for torque and speed combinations falling within MPTA region 60, through any of voltages A, B or C. Because increasing voltage may generally increase some losses as shown above, it follows that efficiency may be achieved by operating with voltage A as the command voltage for speeds and/or torques achievable within the MPTA region 60.

In other examples described with reference to FIG. 1, within an area between the MTPA curve 56 for voltage C, and the maximum torque curve 58 for voltage C, a field weakening region 62 for voltage C may be defined. It should be noted that the maximum torque curves 48 and 54 for voltages A and B respectively, extend into the field weakening region 62 of voltage C. This means that at least for some torque and speed combinations falling within field weakening region 62, voltages A and B may possibly be viable options by using field weakening control to achieve an operating point, in this region, to achieve the same torque and speed combination condition, using a higher voltage will require a lower current for the field weakening operation. Accordingly, for speed requirements to the right of the MTPA curve 56, voltage C is the most efficient choice in these examples. This is due to lower power losses at lower currents, for voltage C, as compared to what those for voltages A or B. As a result, when torque and speed combinations fall above (generally to the right as viewed), the MTPA curve 56, voltage C may generally be the most efficient choice.

In additional examples, an area in FIG. 1 may be defined between the MTPA curve 46 of performance curves 26 and the MTPA curve 56 of performance curves 30. This intermediate area 64 is bounded by axis 24, MTPA curve 46, the constant torque segments 34, 36, and MPTA curve 56. In this example, voltage A may be the minimum voltage at which the system operates, and voltage C may be the maximum voltage at which the system operates. So, intermediate area 64 is between the minimum voltage MPTA curve and the maximum voltage MTPA curve. In this intermediate area 64, at least some torque and speed combinations could be achieved with either voltage A, B or C. This is because for voltage A, the maximum torque curve 48 extends into the intermediate area 64, and for voltage B, the MPTA curve 52 and the maximum torque curve 54 extend into the intermediate area 64. Determining the most efficient voltage choice for a given torque and speed combination to use in intermediate area 64 for an optimal voltage command, requires additional considerations. Consider for example, points along the MPTA curve 52 above the maximum torque curve 48. Voltage A cannot supply the required torque because the points are above the maximum torque curve 52. Voltages B and C may be viable choices, each without field weakening control, but because the higher voltage C would entail greater losses as shown above, voltage B is the most efficient choice. In another example, consider points along the MTPA curve 52 below the maximum torque curve 48. Here, voltages A, B and C are viable options. Voltage C may not be the most efficient for the higher voltage reason mentioned above. Voltage A would operate in field weakening control, while voltage B would operate at MTPA control. MTPA operation would provide better efficiency because in the field weakening, achieving the same torque would require more current. As a result, voltage B would again be the most efficient choice. To expand on these examples, additional methods of determining the most efficient voltage choice will be discussed below.

Figure 2:
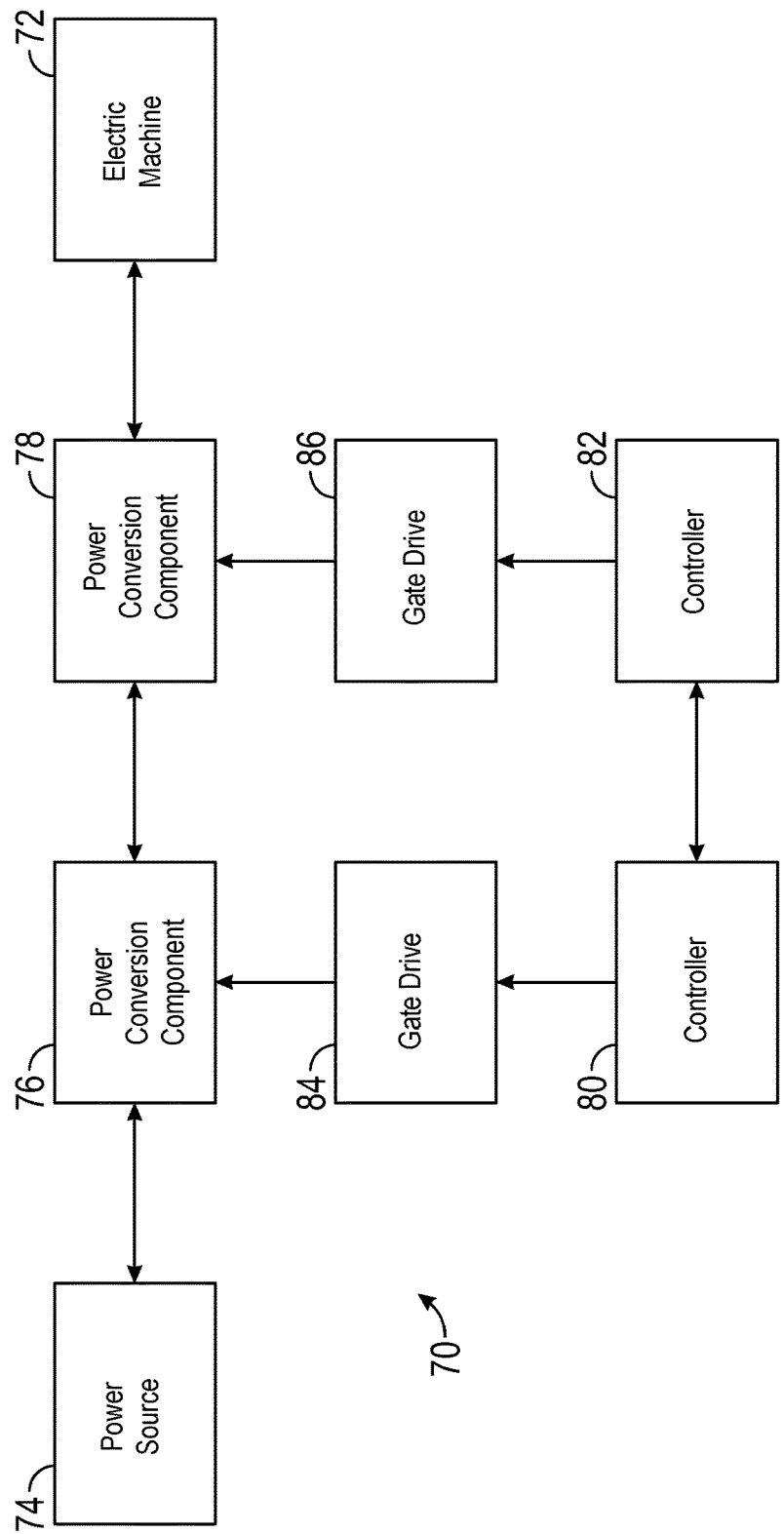
FIG. 2 is a simplified diagram of an exemplary system in which the control of an electric machine may be performed according to a number of exemplary variations.

With reference to FIG. 2, in a number of examples, a system 70 may include an electric machine 72. The electric machine 72 is an exemplary device that may be supplied with the voltages described in relation to FIG. 1, or as otherwise described herein. The electric machine 72 may include a rotor that may develop torque and may rotate at a speed, in response to a given supply of power, in a number of examples, the electric machine 72 may be a motor, or a motor/generator, or may be another device. In some examples, the electric machine 72 may be a permanent magnet motor, which may be an internal permanent magnet motor, or may be an induction machine, or may be another type of motor or machine. The system 70 may include a power supply 74, which may be a DC supply or may be an AC supply. In some examples the power supply 74 may include one or more of a battery, fuel cell, power distribution system connection, grid connection, generator, or other source(s). In some examples, the power source may be the power system bus of another device, for example, of a vehicle, or another device that may employ the electric machine 72.

In a number of examples, the system 70 may include one or more power conversion components, for example, power conversion component 76 and/or power conversion component 78. The power conversion components 76, 78 may be an AC-AC converter, an AC-DC converter, a DC-DC converter or a DC-AC converter (inverter). The selection of the power conversion component or components 76, 78, may be determined by the needs of the system 70, and the objectives for operating the electric machine 72 with the power source 74. In a number of examples where the power source 74 may be a DC power source and the electric machine 72 may be a motor, the power conversion component 76 may be a DC-DC converter. In a number of examples where the electric machine may be an AC motor and the power source may be a DC supply, the power conversion component 78 may be an inverter. In a number of examples where the electric machine 72 may operate as a generator, the one or more power conversion components 76, 78 may be bi-directional. The power conversion components 76, 78 may be connected with one or more controllers 80, 82. The controller or controllers 80, 82 may be connected with the power conversion components 76 and/or 78 through one or more gate drives 84, 86. The gate drive or drives, may operate to amplify power that may be received as low-power input from the controller or controllers 80, 82, and may produce a drive input such as for the gate of a high-power transistor/power semiconductor device.

In a number of examples, controllers 80, 82 may be combined into one controller or may be packaged together, and/or may operate integrated or partitioned programs/algorithms. In a number of examples, the controller(s) 80, 82 may include one or more processors, or memory storage units that may be coupled to the processor(s), or one or more interfaces electrically coupling the processor(s) to one or more other devices, including at least one or the other of the power conversion components 76, 78, such as through one or more gate drives 84, 86. In a number of examples, coupling may be provided to a sensor device or devices (not shown), such as associated with the electric machine 72, or to those associated with a different component of the system 70, and/or of another product with which the system 70 operates. The processor(s) may carry out programs, execute instructions or make calculations that may provide at least some of the functionality for the power conversion components 76, 78 and/or the processes and methods described herein. Data, calculations, and/or instructions may be stored, for example as look-up tables, formulas, algorithms, maps, models, and/or any other suitable format. Memory may include any suitable type of storage article and/or device. It is therefore to be understood that the methods described herein may be at least partially performed by any electronic sources and/or devices capable of executing instructions corresponding to one or more steps of any disclosed methods.

Figure 3:
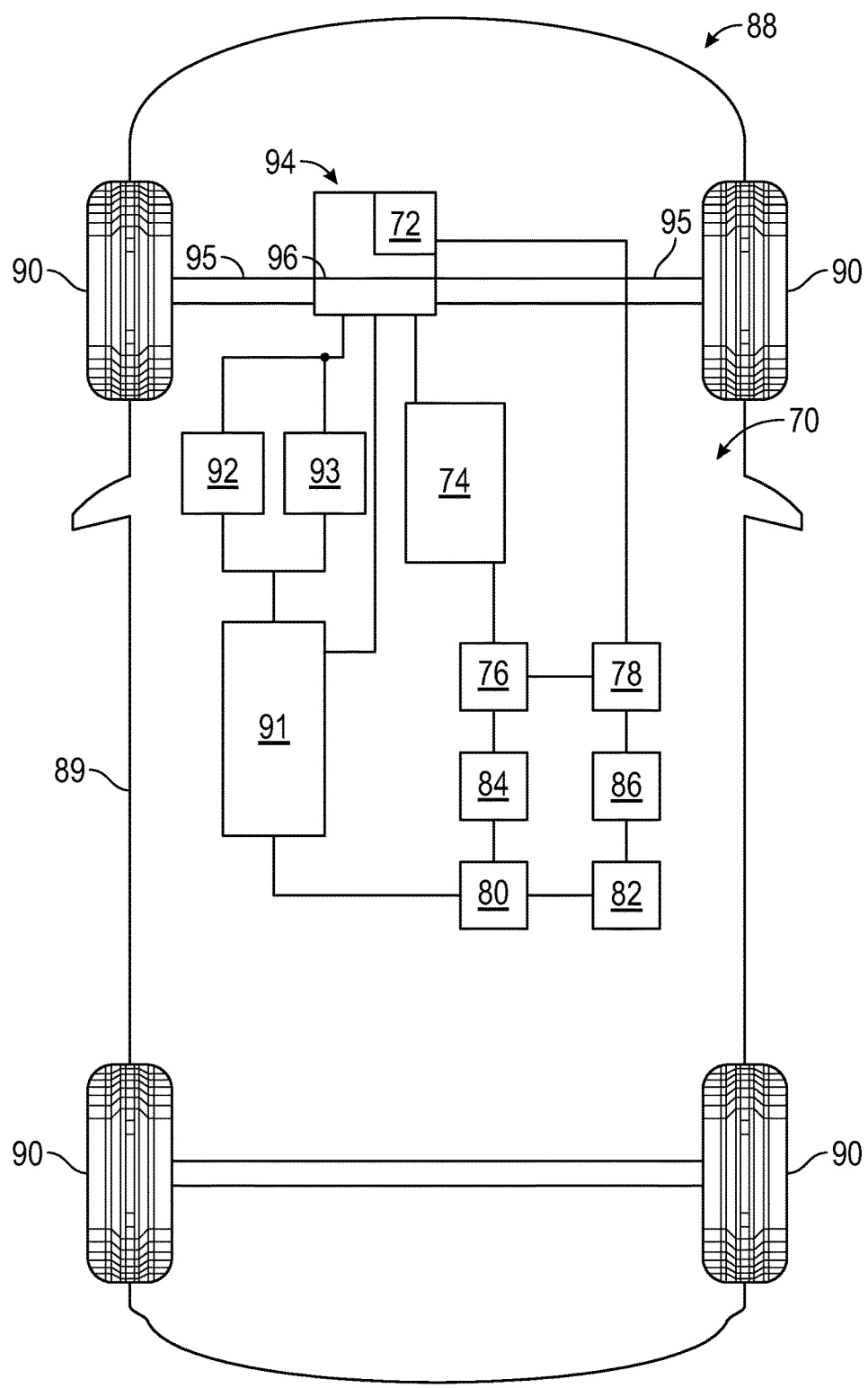
FIG. 3 is a functional block diagram of a vehicle that includes a system for controlling a traction motor, in accordance with an exemplary embodiment.

In a number of examples, the system 70 may be employed in a vehicle 88, such as indicated in FIG. 3. The vehicle 88 may be any one of a number of different types of land, sea, or air vehicles, and in certain embodiments, may for example, be a passenger automobile of any configuration. As depicted in FIG. 3, the vehicle 88 may include, in addition to the above-referenced system 70, any, or any combination of: a body 89, wheels 90, an electronic control system 91, a steering system 92, and a braking system 93. The wheels 90 may each be rotationally coupled to the body 89. In various embodiments the vehicle 88 may differ from that depicted in FIG. 3. For example, in certain embodiments the number of wheels 90 may vary. By way of additional examples, in various embodiments the vehicle 88 may not have wheels 90 that react against a roadway, but may include another method of converting torque into motion, for example through pitched blades operating against a fluid.

In the examples illustrated in FIG. 3, the vehicle 88 may include at least one propulsion system 94, which in these examples may drive the wheels 90. The propulsion system 94 may include an engine and/or a motor, which may include a device such as the electric machine 72. In a number of examples, the electric machine 72 may be an electric motor/generator that may be powered by the power source 74, which may be a rechargeable energy storage system, and in a number of examples may be a battery or batteries. In a number of examples, the propulsion system may include a combustion engine, such as in a hybrid arrangement with the electric machine 72, or in another configuration. In a number of examples, the electronic control system 91 may include variations of components or modules that may be packaged together or distributed to various locations of the vehicle 88. In a number of examples, the electronic control system 91 may include an engine control module, a body control module, a transmission control module, a battery management system and/or one or more other components to control a system or systems of the vehicle 88. The propulsion system 94 may be coupled to at least some of the wheels 90 through one or more drive shafts 95. In some examples, the propulsion system 94 may include a transmission 96 to provide variable output. In a number of examples, the electric machine 72 may be coupled to the transmission 96. In a number of examples, an engine and/or transmission 96 may not be necessary, and may be omitted.

In the examples illustrated in FIG. 3, the steering system 92 may control the direction of at least some of the wheels 90. In certain embodiments, the vehicle 88 may be autonomous, utilizing steering commands that are generated by a processor, such as in the electronic control system 91. The braking system 93 may provide braking for the vehicle 88. The braking system 93 may receive inputs from a driver via a brake pedal (not shown), which may affect vehicle deceleration through wheel brakes (not shown). A driver may also provide inputs via an accelerator pedal (not shown) as to command a desired speed or acceleration of the vehicle. Response of the vehicle 88 to these inputs may be effected through an output speed and/or torque of the electric machine 72. Similar to the description above regarding possible variations for the vehicle 88, in certain embodiments steering, braking, and/or acceleration may be commanded by a computer instead of by a driver, such as through autonomous capability. In a number of examples, parts of the system 70, may be included in the electronic control system 91 or may be coupled thereto.

In a number of examples, the electric machine 72 may be supplied with power from the power source 74 to propel the vehicle 88. For example, DC power may be supplied from the power source 74 to the power conversion component 76, which may be a DC-DC converter, which may increase the DC voltage. In this example, the DC power with increased voltage may be converted to AC power through the power conversion component 78, which may operate as an inverter. The AC power may be supplied to the electric machine 72 to generate a desired speed and/or torque. In a number of examples, the electric machine may be driven by the wheels 90 through the drive shafts 95, which may be used to charge the power source 74, such as in regenerative braking. In these examples the power conversion components 76, 78 may operate bi-directionally.

Figure 4:
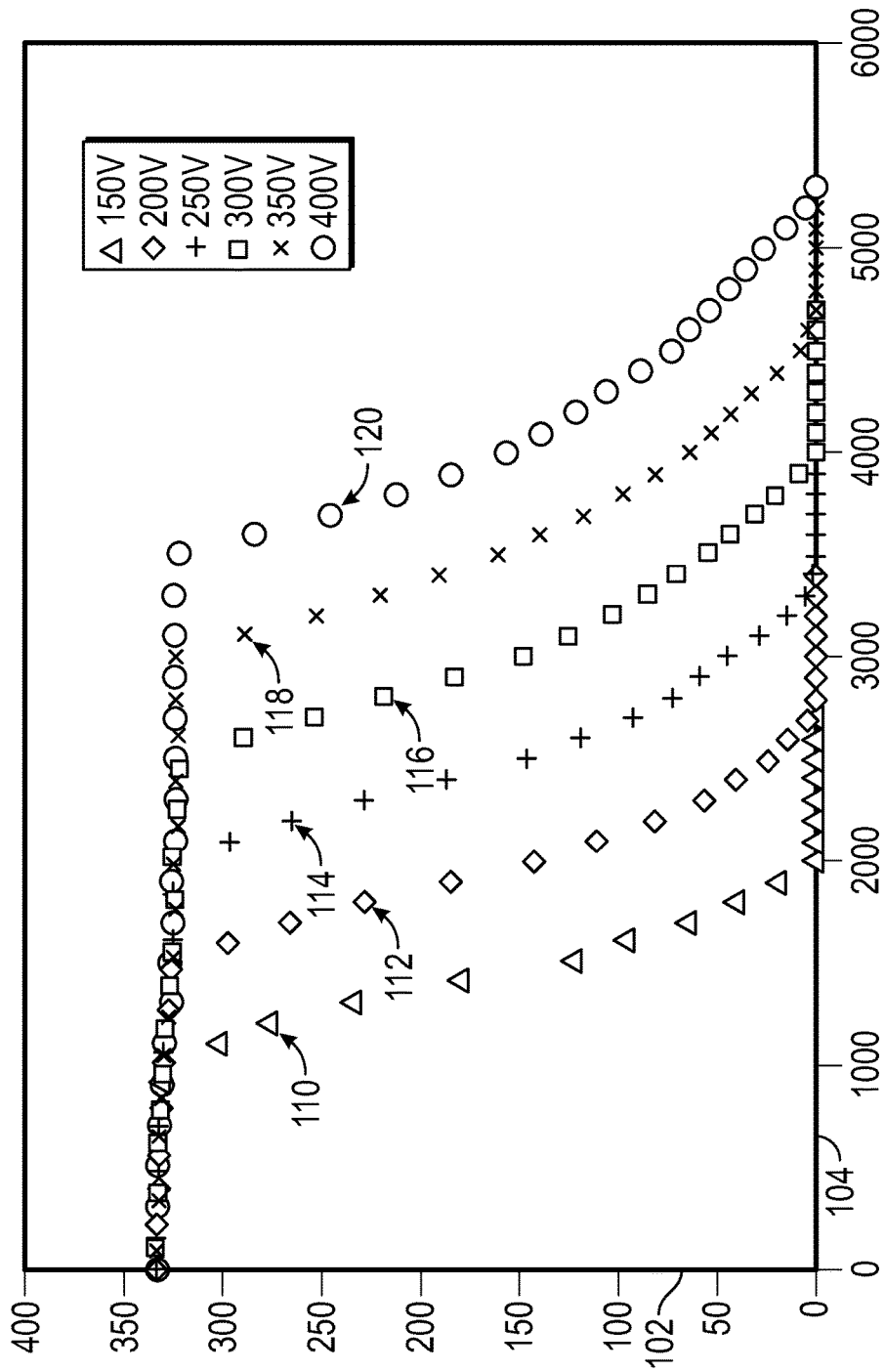
FIG. 4 is an example data point plot of base speed locus at various voltages with torque on the vertical axis and speed on the horizontal axis.

In a number of examples, the electric machine 72 may be supplied with a voltage and current through the system 70 to provide required operating points. For example, the electric machine 72 may be controlled to supply a torque and/or speed output to provide the operating points for encountered operating conditions, which may be consistent, or may be varying. In a number of examples, performance curves of the electric machine 72 may be defined such as through the experimental collection of data, for example by characteristic testing. With reference to FIG. 4, in a number of examples, data may be collected, such as from electric machine 72, at multiple voltages to generate MTPA plots of torque-speed points on a torque versus speed chart. In FIG. 4, torque may be depicted on the vertical axis 102, such as in Newton-meters, and speed may be depicted on the horizontal axis 104, such as in revolutions per minute. In a number of examples, the plot points may be connected to develop MTPA curves as performance curve representations for each voltage. The curves may be converted to other representations, for example, tables, formulas, maps, models, and/or any other suitable format for storage, reference and evaluation purposes. The representations may be stored in controllers, such as the controller(s) 80, 82, for example in memory. Data may be collected at each of several speeds for different voltages. In these examples the speeds may range from zero to approximately 5500 revolutions per minute. The speeds used will depend on a given application and the range may vary accordingly. In these examples, the voltages may range from 150-400 volts (150V-400V). The voltages used will depend on a given application and the range may vary accordingly. As shown in FIG. 4, in a number of examples, plots may be generated for 150V at data set 110, 200V at data set 112, 2504% at data set 114, 300V at data set 116, 350V at data set 118, and 400V at data set 120. In these examples, 150V may be the minimum voltage, and 400V may be the maximum voltage. In these examples, data for four plots may be collected between the data collected for the minimum and maximum voltage, but it should be appreciated that any number of plots may be generated for the desired efficiency/voltage increments of the application.

Figure 5:
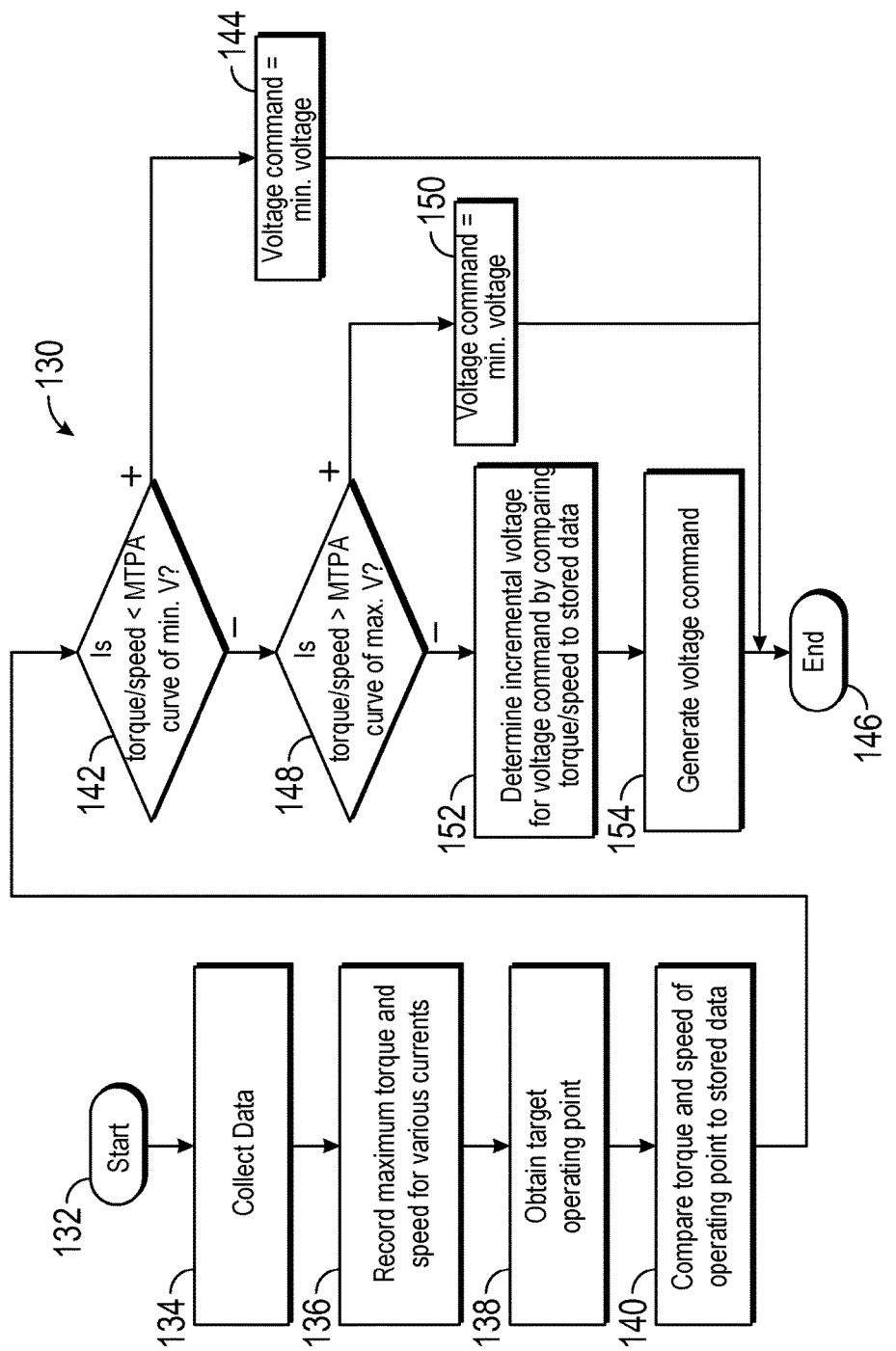
FIG. 5 illustrates methods according to a number of exemplary variations.

In a number of examples methods may be carried out to determine an optimal voltage command for a given torque-speed operating point as further described in relation to the flow chart illustrated in FIG. 5. The methods 130 may be initiated at step 132. Proceeding to step 134, data may be collected from the system that will be operated using these methods 130. For example, data may be collected from the electrical machine 72 of the system 70, or a representative sample thereof, using an appropriate characterization method. For example, motor characterization may be conducted at a given voltage by applying increments in current from zero to maximum rated current. A sweep may be conducted between a principle axis of the motor and the current vector for a given reference frame, for example the motor's d-q frame. Proceeding to step 136, at each current, the maximum torque and speed point may be recorded. For example, as shown in FIG. 4, data collection at 250V may generate the data set 114, where each point represents the maximum torque and speed combinations without entering the field weakening region at the given voltage, 250V. The data set 114 may define an MTPA curve of an electric machine, for example the electric machine 72, when operated at 250V. Similarly, the data sets 110, 112, 116, 118 and 120 may be collected. Points in the data set(s) may be connected to define a continuous MTPA curve or curves. In a number of examples, the data set(s), may be generated as a continuous waveform rather than as discrete points. In a number of examples, the MTPA curves defined by the data sets for each voltage tested, may be arranged as a representation of the MPTA curve in an accessible form and stored in a controller such as the controller(s) 80, 82. In some examples, one form may be a lookup table or tables. In a number of examples steps 132-136 may be performed during a development phase, and may be programmed into the product that will utilize the methods 130, for example into the system 70.

In a number of examples, the methods 130 may proceed to step 138 where the target operating point of the electric machine 72, for example, is obtained. In an application where the electric machine 72 is a traction motor of a vehicle, the torque and speed factors required to match the target operating point may be obtained from an available onboard source. For example, the vehicle may be operating at a present state, and a torque and speed required of the electric machine 72 to move to the target operating point may be determined by the vehicle's drive system as a result of various inputs such as accelerator pedal, vehicle speed, drive system state, etc. With the obtained operating point values, the methods 130 may proceed to step 140, where the torque and speed required to move to the target operating point are compared to the stored data. For example, the torque and speed may be compared to each recorded representation of the MTPA curves stored for example, in the controller(s) 80, 82. Proceeding to step 142, a minimum voltage value may be predetermined as described above. A determination may be made as to whether the target operating point (torque and speed), is less than the stored representation of the MTPA curve for the minimum voltage, e.g. within the MTPA region of the system's minimum voltage. For example, with reference to FIG. 1, the determination may evaluate whether the target operating point is within the MTPA region 60. When it is positively determined that the target operating point is within the MTPA region of the system's minimum voltage, the methods 130 may proceed to step 144 where a voltage command is generated at a magnitude equal to the minimum voltage. For example, using the system 70 with a minimum operating voltage of 150V, a voltage command is sent to operate the electric machine 72 at 150V. From step 144 the methods 130 may proceed to end the cycle at step 146.

Returning to step 142, when the determination is negative and the target operating point is not within the MTPA region of the system's minimum voltage, the methods 130 may proceed to step 148. A maximum voltage value may be predetermined as described above. At step 148 a determination may be made as to whether the target operating point (torque and speed), is above the MTPA curve of the system's maximum voltage. For example, with reference to FIG. 1, the determination may evaluate whether the target operating point is above (generally to the right as viewed), the MTPA curve 56. When positively determined that the target operating point is above the MTPA curve of the system's maximum voltage, the methods 130 may proceed to step 150 where a voltage command is generated to operate at the maximum voltage. For example, using the system 70 with a maximum operating voltage of 400V, a voltage command is generated to operate the electric machine 72 at 400V. From step 150 the methods 130 may proceed to end the cycle at step 146. Returning to step 148, when the determination is negative and the target operating point is not above the MTPA curve of the system's maximum voltage, this means that the system's intermediate area is involved. For example, with reference to FIG. 1, the operating point would fall in intermediate area 64. At this point, the methods 130 may proceed to step 152.

In a number of examples, at step 152, a determination may be made as to which voltage choice among the incremental voltages chosen between the system's minimum and maximum voltages, is the optimum voltage for operation at the target operating point. The target operating point (torque and speed factors), may be compared to the stored data for each voltage, and for example, through interpolation, the optimum voltage may be selected. For example, the lowest voltage for which the system will operate in MTPA control at the target operating point without invoking field weakening control may be selected. In a number of examples this may be accomplished by comparing the data points for the target operating point with data points for individual MTPA curves stored in memory. The MTPA curve corresponding to the lowest voltage available within the stored samples, where the target operating point is less than that MTPA curve representation, may be selected to minimize the voltage command magnitude, while remaining in MTPA control without field weakening controls. When the voltage selection is determined, the methods 130 may proceed to step 154 where a command to operate at the selected voltage is generated. It should be understood that the selected voltage will be between the minimum and maximum voltages, and that the number of voltage increments selected and stored in memory, will affect the overall system efficiency. It should also be understood that the number of increments selected may influence how often the voltage level at which the system operates may change. From step 154, the methods 130 may end the cycle at step 146. In a number of examples, testing has shown that efficiency improvements obtained through the methods 130 may be as high as 18.05% at a given operating point, when compared to operation of the same vehicle traction motor at that operating point without the use of the methods 130.

Through the foregoing examples, optimal voltage commands may be generated through methods that enhance the use of MPTA control. While examples are described, it should be appreciated that a vast number of variations exist. It should also be appreciated that the examples are not intended to limit the scope, applicability, or configurations in any way. Rather, the foregoing detailed description will provide those skilled in the art with a convenient road map for implementing an aspect or aspects of the examples. It being understood that various changes may be made in the function and arrangement of elements described in an example without departing from the scope as set forth in the appended claims.

What is claimed is:

1. A method comprising:
   providing a system with an electric machine that operates in response to a voltage command;
   determining, based on characteristics of the system, a minimum voltage for the voltage command;
   operating the electric machine only at or above the minimum voltage;
   determining, based on capabilities of the system, a maximum voltage for the voltage command;
   operating the electric machine only at or below the maximum voltage;
   determining, by testing the system, a first representation of a first performance curve for the electric machine corresponding to the minimum voltage;
   determining, by testing the system, a second representation of a second performance curve for the electric machine corresponding to the maximum voltage;
   obtaining, by a controller and in response to a required torque and a required speed for the electric machine, an operating point of the electric machine to be achieved through the voltage command;
   evaluating, by the controller, whether the operating point lies between the first and second representations;
   when the operating point lies between the first and second representations, determining, by the controller, a magnitude of the voltage command, by evaluating which of a plurality of voltages corresponding to a third performance curve falling between the first and second representations is most efficient in operating the electric machine at the operating point;
   supplying, by a power supply controlled by the controller and to the electric machine, the voltage command at the magnitude; and
   operating the electric machine using the voltage command.

2. The method of claim 1 comprising selecting, by the controller and from the plurality of voltages, a lowest voltage for which the system will operate at the operating point without invoking a field weakening control.

3. The method of claim 1 wherein, the operating point is based on a speed factor, and wherein determining the magnitude of the voltage command, comprises interpolating based on the speed factor.

4. The method of claim 1 wherein, the operating point is based on a torque factor and a speed factor, and wherein determining the magnitude of the voltage command, comprises interpolating based on the torque and speed factors.

5. The method of claim 1 comprising: determining whether the operating point has factors that are less than the first representation; and setting the magnitude at the minimum voltage when the factors are less than the first representation.

6. The method of claim 1 comprising: determining whether the operating point has factors that are greater than the second representation; and setting the voltage command at the maximum voltage when the factors are greater than the second representation.

7. The method of claim 1 comprising: determining the first performance curve and the second performance curve from results of a characteristic testing; and storing, in a memory accessible by the controller, the results of the characteristic testing as the representations, for reference when evaluating whether the operating point lies between the first representation and the second representation.

8. The method of claim 1 comprising: determining, by testing, additional representations between the first representation and the second representation, wherein each of the additional representations corresponds to a discrete performance curve, which corresponds to a discrete voltage between the minimum voltage and the maximum voltage.

9. The method of claim 1 comprising: driving a propulsion system of a vehicle with the electric machine, wherein the representations comprise representations of a maximum speed of operating the electric machine at a corresponding voltage without imparting a field weakening control in the electric machine.

10. The method of claim 9, wherein field weakening comprises imparting a current component in the electric machine to weaken its magnetic field.

11. A method comprising:
    providing a system with an electric machine that operates in response to a voltage command, wherein the electric machine operates at a minimum voltage, at a maximum voltage, and between the minimum and maximum voltages;
    determining, by testing, a first representation of a first maximum torque per ampere (MTPA), curve for the electric machine at the minimum voltage;
    determining, by testing, a second representation of a second MTPA curve for the electric machine at the maximum voltage;
    obtaining, by a controller, an operating point for the electric machine having torque and speed factors to be achieved through the voltage command;
    evaluating, by the controller, whether the operating point lies between the first and second representations, meaning whether the torque and speed factors are greater than the first representation and less than the second representation; and when the operating point does lie between the first and second representations, determining by the controller, the voltage command by comparing the torque and speed factors to incremental representations between the first and second representations to determine a magnitude of the voltage command that is most efficient in operating the electric machine;

supplying, by the controller, the voltage command to the electric machine; and operating the electric machine using the voltage command to achieve the operating point.

12. The method of claim 11 wherein, determining the voltage command, comprises interpolating based on the torque factor and the speed factor.

13. The method of claim 11 comprising: determining whether the operating point is less than the first representation; and setting the voltage command at the minimum voltage when the operating point is less than the first representation.

14. The method of claim 11 comprising: determining whether the operating point is greater than the second representation; and setting the magnitude of the voltage command at the maximum voltage when the operating point is greater than the second representation.

15. The method of claim 11 comprising: determining the first MPTA curve and the second MPTA curve from results of a characteristic testing; and storing, in a memory accessible to the controller, the results of the characteristic testing as the representations for reference when evaluating whether the operating point lies between the first and second representations.

16. The method of claim 11 comprising: determining a number of additional MPTA curves between the first MPTA curve and the second MPTA curve, and creating additional representations of the additional MPTA curves.

17. The method of claim 11 comprising: when the operating point does lie between the first and second representations, selecting, by the controller, one of the incremental representations that represents the magnitude of the voltage command that is lowest among the incremental representations without invoking field weakening control, meaning without introducing a current component in a d-q frame of the electric machine that would reduce flux density in an air-gap of the electric machine.

18. The method of claim 17 comprising: determining a number of additional MPTA curves between the first MPTA curve and the second MPTA curve as the incremental representations, wherein each of the additional MPTA curves corresponds to a maximum torque per ampere characteristic for a corresponding voltage between the minimum and maximum voltages, wherein the maximum torque per ampere characteristic corresponds to the maximum speed of operating the electric machine at the corresponding voltage without imparting a field weakening control in the electric machine.

19. The method of claim 18 comprising: constructing the electric machine as a traction motor; wherein determining the voltage command comprises comparing the operating point with data points of individual MTPA curves, and identifying the individual MTPA curve corresponding to a lowest voltage available; and selecting the lowest voltage as the magnitude for the voltage command.

20. A method of determining, for an electric machine, a voltage command that has an optimal voltage magnitude for torque and speed factors of a target operating point comprising:

operating the electric machine in response to the voltage command to drive a propulsion system of a vehicle, wherein the system electric machine operates at a minimum voltage, a maximum voltage, and between the minimum and maximum voltages;

determining, by testing the electric machine, a first representation of a first MTPA curve at the minimum voltage, wherein the first MTPA curve represents maximum torques achieved by the electric machine for the minimum voltage at various speeds;

determining, by testing the electric machine, a second representation of a second MTPA curve at the maximum voltage, wherein the second MTPA curve represents maximum torques achieved by the electric machine for the maximum voltage at various speeds;

determining, by testing the electric machine, additional incremental representations between the first representation and the second representation, wherein each of the additional incremental representations corresponds to a discrete MTPA performance curve, each of which corresponds to an incremental voltage between the minimum voltage and the maximum voltage;

obtaining, by the controller from systems of the vehicle, the target operating point to be achieved by the electric machine through the voltage command;

evaluating, by the controller, whether the target operating point lies between the first and second representations, meaning whether the operating point has torque and speed factors that are greater than characterized by the first representation and less than characterized by the second representation;

whenever the target operating point lies below the first representation, using the minimum voltage as the voltage command whenever the target operating point lies above the second representation, using the maximum voltage as the voltage command;

when the target operating point does lie between the first and second representations, comparing by the controller, the target operating point to the incremental representations;

determining, by the controller, which of the incremental voltages is the optimum voltage to operate the electric machine at the operating point;

selecting the optimum voltage; and operating the electric machine at the optimum voltage to propel the vehicle using the propulsion system.

* * * * *